United States Patent
Cahn

(10) Patent No.: US 6,868,148 B1
(45) Date of Patent: Mar. 15, 2005

(54) METHODS FOR AVOIDING CHERRY PICKING IN TELECOMMUNICATIONS NETWORKS

(75) Inventor: Robert Cahn, Carmel, NY (US)

(73) Assignee: AT&T Corp., New York, NY (US)

( * ) Notice: Subject to any disclaimer, the term of this patent is extended or adjusted under 35 U.S.C. 154(b) by 632 days.

(21) Appl. No.: 10/013,040

(22) Filed: Oct. 30, 2001

(51) Int. Cl.[7] ............................................ H04M 15/00
(52) U.S. Cl. ............................. 379/114.02; 379/114.1
(58) Field of Search ...................... 379/112.07, 112.08, 379/114.01, 114.02, 114.03, 114.06–114.1, 114.12, 133–134; 705/30, 32, 34

(56) References Cited

U.S. PATENT DOCUMENTS

| | | | |
|---|---|---|---|
| 6,076,068 A | * | 6/2000 | DeLapa et al. ............... 705/14 |
| 6,393,409 B2 | * | 5/2002 | Young et al. .................. 705/37 |
| 2004/0172265 A1 | * | 9/2004 | Spragle et al. ................. 705/1 |

* cited by examiner

*Primary Examiner*—Duc Nguyen

(57) ABSTRACT

Methods of minimizing the cherry picking potential of a network having regions in which nodes of the network may be found are disclosed. The methods randomly seed each region of the network with a node and, and an unassigned node is selected at random. A cherry picking potential is then computed for that node in the region and the method then loops around all of the nodes in all of the regions to find the minimum cherry picking potential for the network.

15 Claims, 19 Drawing Sheets

| Number of Pairs | Unit cost | total cost |
|---|---|---|
| 2 | 0.4 | 0.8 |
| 1 | 0.8 | 0.8 |
| 1 | 5 | 5 |
| 2 | 5.4 | 10.8 |
| 2 | 0.7 | 1.4 |
| 1 | 1.4 | 1.4 |
| 2 | 5.7 | 11.4 |
| 4 | 6.1 | 24.4 |

FIG. 4

| Number of Pairs | Unit cost | total cost | Endpoints | $\overline{ucost}$ |
|---|---|---|---|---|
| 2 | 0.4 | 0.8 | $P_1$ | |
| 1 | 0.8 | 0.8 | $P_1$ | $\overline{ucost}(P_1,P_1) = 0.5333$ |
| 1 | 5 | 5 | $P_1,P_2$ | |
| 2 | 5.4 | 10.8 | $P_1,P_2$ | |
| 2 | 0.7 | 1.4 | $P_1$ | |
| 1 | 1.4 | 1.4 | $P_1$ | $\overline{ucost}(P_2,P_2) = 0.9333$ |
| 2 | 5.7 | 11.4 | $P_1,P_2$ | |
| 4 | 6.1 | 24.4 | $P_1,P_2$ | $\overline{ucost}(P_1,P_2) = 5.7333$ |

FIG. 5

| SVTY | SPEED | FIXED_COST | _DIST_COST1 | DIST_COST2 | DIST1 |
|---|---|---|---|---|---|
| D96 | 9600 | 200 | 2 | 1.2 | 300 |
| D56 | 56000 | 500 | 5 | 3 | 200 |
| T1 | 1544000 | 2500 | 25 | 15 | 200 |

FIG. 6

| SVTY | SPEED | FIXED_COST | _DIST_COST1 | DIST_COST2 | DIST1 |
|---|---|---|---|---|---|
| T1 | 1544000 | 2500 | 25 | 15 | 200 |

FIG. 9

| Number of Regions | Cherry Picking Potential |
|---|---|
| 1 | 23.357 |
| 2 | 17.203 |
| 3 | 14.835 |
| 4 | 13.617 |
| 5 | 12.254 |
| 6 | 11.225 |
| 7 | 9.821 |
| 8 | 8.420 |
| 9 | 8.033 |

FIG. 16

| Margin | CPP | Reduction |
|---:|---:|---:|
| 1.0 | 8.420 | 0% |
| 1.1 | 6.261 | 25.6% |
| 1.2 | 4.451 | 47.1% |

FIG. 19

METHODS FOR AVOIDING CHERRY PICKING IN TELECOMMUNICATIONS NETWORKS

BACKGROUND OF THE INVENTION

1. Field of the Invention

This invention relates generally to methods of reducing the instances of cherry picking in telecommunications networks. More specifically, with respect to telecommunications or other services, the invention relates to algorithms that minimize the ability of customers of the network to sign up for the most costly services between two regions of the network, while using other carriers or connections in place of low-cost services.

2. Description of the Related Art

Since the telecommunications industry was deregulated in the 1980s, a complex system of tariffs has emerged which governs the costs of providing telecommunications services (voice, data, video, etc.) to customers. Telecommunications service providers have attempted to simplify their tariffs by grouping nodes in their networks into zones or regions, and specifying a flat tariff between zones. However, in doing so telecommunications service providers have opened themselves up to the customer practice of "cherry picking" which is the practice of signing up for services that are the most costly to the carrier between two regions, and using other carriers or connections in place of low-cost services. Telecommunications services are often offered in "baskets." As often occurs in grocery stores with a fruit selection for a basket, customers examine a telecommunications service in the proposed basket to decide if they wish to pick a particular service or services for their basket, hence the term "cherry picking" as used throughout.

Processes and algorithms exist in the art that divide up a network into n regions for multi-drop lines or concentrator placement. These processes are not designed to minimize the effects of cherry picking and, in fact, often produce sets of nodes for a network that do not even address the problems that exist when cherry picking occurs. So-called "greedy algorithms" in network design have been employed in the past, but not in the context of the cherry picking problem. Other approaches to the cherry picking problem involve adding nodes to the best regions of a network, but this solution does not ensure that the effects of cherry picking will be minimized. While it would be possible to design and publish a complete tariff which would overcome the deleterious effects of cherry picking, this would be a difficult and monumental task, would be almost impossible to manage, and would be extremely costly to implement. This also delays the ability of a sales organization to quickly price services, and slows the process of provisioning a network.

The simplest billing model is a flat-rate model. The United States (US) Postal Service (USPS) uses such a model for letters, for example. The cost for one ounce of mail is the same delivered anywhere in the continental United States, Alaska or Hawaii. The postal service is able to use such a simple tariff because they have an effective monopoly over the post box. Other, lower cost carriers are forbidden to use the post box or to deliver first class mail.

Telecommunications network providers are not so fortunate to have a similar type of monopoly. The network services business more resembles the package delivery business where the USPS, Federal Express, UPS and a variety of niche players compete for business.

When multiple carriers compete, there is a natural tendency for the customers to try to mix and match varying offerings to produce a lower cost solution than is offered by any single carrier. A simple example of this comes from voice networking. If a company has two locations with considerable traffic, it will purchase tie-lines, or dedicated trunks, that interconnect these locations. The number of tie-lines is a matter of trunk engineering and is straightforward. By purchasing only enough tie lines so that a 5% level of blocking occurs, customers will ensure a high level of use of these lines. By overflowing the rest of the traffic into the public switched telephone network (PSTN), the telephony costs can be dramatically reduced compared to an all leased line or all switched design.

In data networking an analogous situation exists when there are two services. Assume that a T1 leased line costs $500 and $1 per km per month within the US, while a T1-speed Frame Relay (FR) Permanent Virtual Circuit (PVC) costs $1,200 per month between any two points. It is fairly trivial to see that for short circuits—for example, New York to Philadelphia—customers will use a leased line while if they need a connection from New York to Los Angeles, the customer will opt for the FR PVC.

Given the telecommunications marketplace today, there are always a variety of rate plans in effect. Consequently customers are constantly searching for ways to rearrange their network to take advantage of tariff anomalies. Accordingly, there is a long-felt need in the art for methods and processes that minimize the effects of cherry picking for telecommunications network owners. The methods should be simple to implement, and have no effect on the current tariffs already in place. Moreover, the methods should be applicable to current networks that comprise a plurality of nodes and which can be partitioned into logical regions or zones that minimize the ability to cherry pick, and the effects of cherry picking. Such results have not heretofore been achieved in the art.

SUMMARY OF THE INVENTION

The aforementioned problems are solved and long-felt needs met by methods of minimizing cherry picking in telecommunications networks comprising nodes, and regions in which the nodes may exist, provided in accordance with the present invention. Preferably, each region in the network is seeded with a single, randomly selected node, and an unassigned node in the network is chosen at random. A cherry picking potential for each region in the network is calculated when the unassigned node is added to the region to obtain cherry picking potentials for each region. The unassigned node is then added to the region with the minimum cherry picking potential.

More preferably, "greedy optimizers" may be employed to enhance the cherry picking minimization provided in accordance with the present invention. The term "greedy optimizer" as used herein denotes a family of algorithms known to those skilled in the art which have the effect of maximizing the results of another algorithm at each step along the way, such as those provided in accordance with the present invention, through an iterative technique. The greedy optimizers used in accordance with the present invention loop through all nodes in the network, and through all regions in the network to determine a new cherry picking potential for each of the nodes in each of the regions is a node has been reassigned from one region to another region. A node is selected for a new region that maximizes improvement in the cherry picking potential and that node is then switched to the new region.

It will be appreciated that it may be desirable to determine the theoretical cherry picking potential of a network and compare to the actual cherry picking potential of a network in order to see if the actual cherry picking potential of the network is minimized. In another preferred aspect of the invention, a method of determining whether a cherry picking potential of a network has been minimized is provided, especially for smaller networks. In a preferred embodiment, a theoretical cherry picking potential of the network is determined and an actual cherry picking potential of the network is then observed. It is then desired to compare whether the actual cherry picking potential of the network falls within a range around the theoretical cherry picking potential of the network, thereby determining whether the actual cherry picking potential is at a minimum. More preferably for smaller networks, if the actual cherry picking potential is between about ten and twenty-five percent of the theoretical cherry picking potential, then it may be said that the actual cherry picking potential of the network is minimized.

The methods of the present invention advantageously allow network designers and managers to partition networks and links therein in an optimal manner so as to minimize the instances of cherry picking which have heretofore existed. This will allow networks to be managed and run more efficiently and cost-effectively so as to maximize profits in the network. This will be beneficial to carriers and network providers since network efficiencies will be improved and providers will be able to run networks profitably, thereby allowing new service offerings to be developed and current offerings enhanced. This ultimately will benefit customers. Such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals refer to like elements throughout the several views thereof:

FIG. 4 is a table which lists the calculated average cost of bandwidth between pairs of nodes in the network of FIG. 3;

FIG. 5 is a table which lists the costs of sending data over the network of FIG. 3 in preparation for computing the cherry picking potential of the network;

FIG. 6 is a table of link costs for a fourteen node network having a plurality of link speeds;

FIG. 9 is a table listing the link costs for a homogeneous network having a single speed link;

FIG. 16 is table listing the cherry picking potential for networks based as a function of the number of regions that the network is partitioned into;

FIG. 19 is table listing the reduction in the cherry picking potential due to modest increases in margin.

DETAILED DESCRIPTION OF THE PREFERRED EMBODIMENTS

Figure 1:
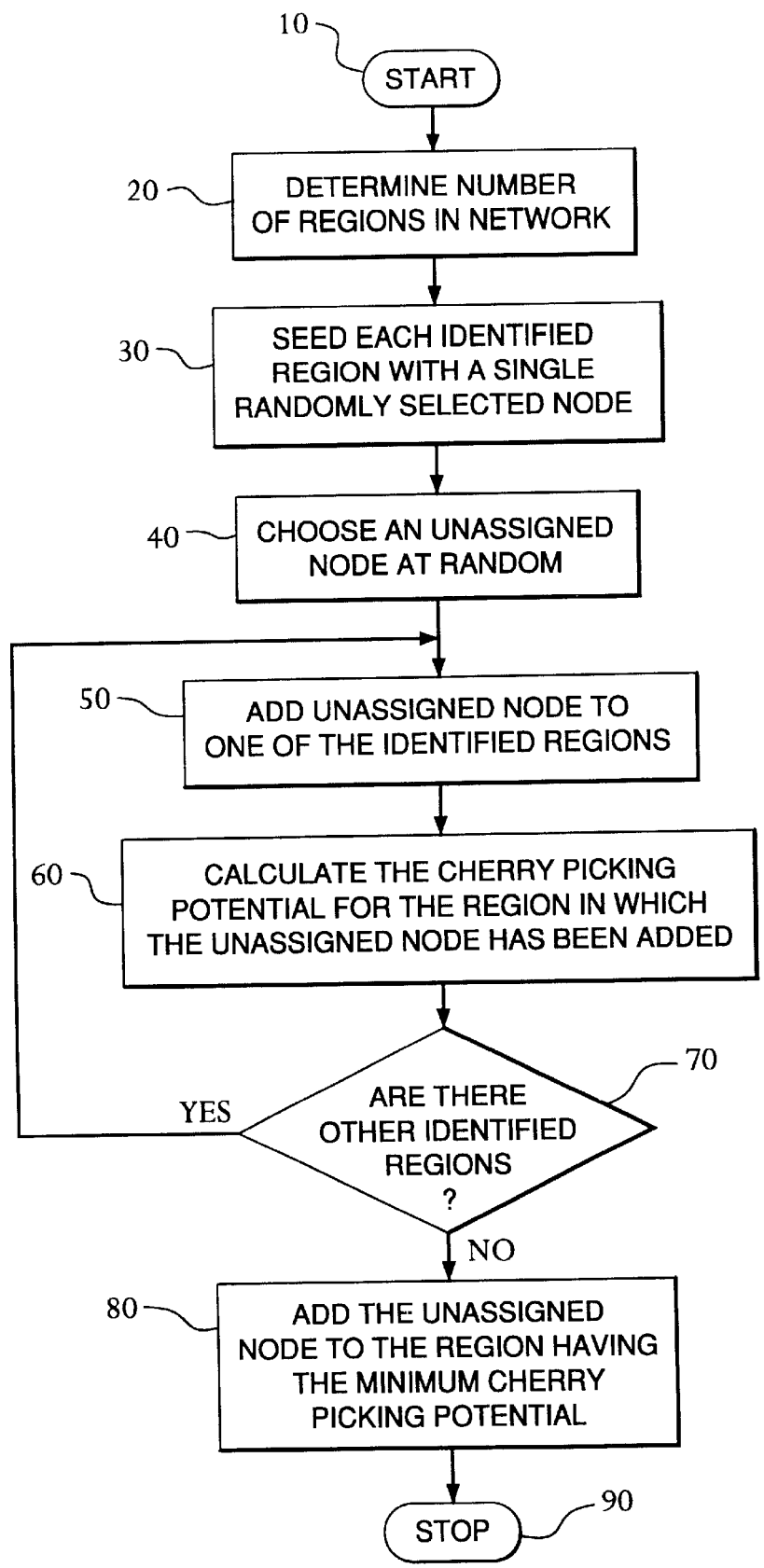
FIG. 1 is a flow chart of a preferred embodiment of methods of reducing cherry picking provided in accordance with the present invention.

Referring now to FIG. 1, a flow chart of a preferred embodiment for minimizing the instances of cherry picking starts at step 10. It will be appreciated that the methods of the present invention may be embodied in software programs that are run on computers. Moreover, the methods may be embodied as firmware or other forms of executable software code in a network or as part of network diagnostic tools. Therefore, the present methods may be written as software code in any appropriate, preferably object oriented, language such as C++, UNIX, JAVA, HTML, XML, WML, VISUALBASIC, or other known languages. The mathematical details of the present methods are described in detail below.

At step 20 it is preferred to determine the number of regions in a network of interest so an input can be supplied to the algorithm which corresponds, at least initially, to the number of regions in the network. As the number of regions increases the cherry picking potential ("CPP") will generally decrease, and so the actual tariff will become more accurate. It is then desired at step 30 to seed each identified region with a single, randomly selected node. At step 40, an unassigned node is chosen at random and at step 50 added to one of the identified regions. Desirably, at step 60 a CPP is calculated for the region in which the unassigned node has been added. It is then preferably determined at step 70 whether there are other identified regions in the network. If so, then the method reverts to step 50 wherein another unassigned node is added and the CPP for the new region is calculated. In this manner, the method loops between steps 50 and 60 to find the best region or regions to which a new node is to be added to decrease the CPP. If not, then the method proceeds to step 80 wherein the unassigned node(s) are added to the region(s) having the minimum CPPs. The method then terminates at step 90.

Figure 2:
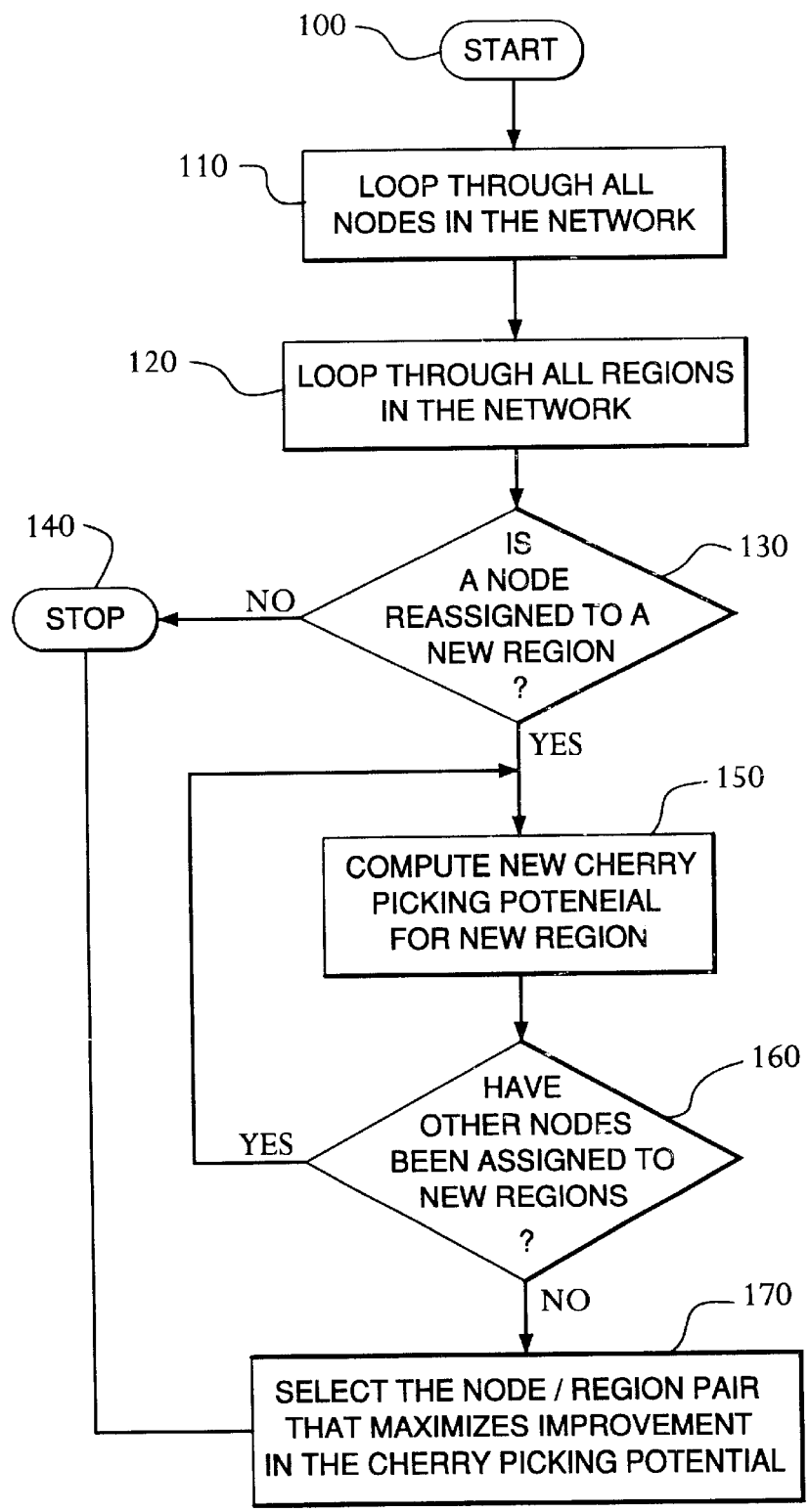
FIG. 2 is a flow chart of a preferred embodiment of a greedy optimizer the algorithm which may be used in conjunction with the methods of the present invention to improve the cherry picking potential results described herein.

Because the initial seeding of the regions with nodes occurs on a random basis in a preferred embodiment of the invention, the CPPs determined in accordance therewith, and the ultimate partitioning of the network to minimize the overall CPP thereof, may not be optimum when the aforedescribed methods are employed. Therefore, it may be advantageous in accordance with an aspect of the present invention to employ a greedy optimizer which will aid in producing maximum improved results for the overall CPP of the network. FIG. 2 is a flow chart of a greedy optimizer method which also may be similarly programmed in software.

The greedy optimizer algorithm of FIG. 2 starts at step 100, and at step 110 the algorithm loops through all of the nodes in the network to identify all of the nodes. At step 120, the algorithm then loops through all of the regions in the network to identify all of the regions. It is then determined at step 130 whether a node is reassigned to a new region based on the two loops performed in steps 110 and 120. If not, then at step 140 the method terminates. If so, then at step 150 a new CPP for the new and old regions are calculated. It is then preferably determined at step 160 whether other nodes have been assigned to other new regions as a result of the loops performed in steps 110 and 120. If so, the method reverts to step 110 where new CPPs may be calculated for the new, additional regions and so that the nodes and regions that provide the most improvement to the CPP are found when the loop is reiterated. If not, then at step 170, it is desired to select the node/region pair, if one exists, that maximizes improvement in the CPP for the network since looping through the algorithm in accordance with the invention has discovered an acceptable pair. The method then terminates at step 140.

To obtain a theoretical measure of the cherry-picking problem, assume that a network can be described by a set of switches or routers, V, interconnected by LANS, leased lines, or fibers. This network is modeled as a graph G=(V,E). Given any node, v, or edge e, the monthly cost is known. To account for the cost, if a link v, has capacity $Cap_e$ then there is a desired utilization $util_e$. The until cost for bandwidth on this link is:

$$\frac{cap_e \times util_e}{Cost_e}$$

This cost is denoted as ucost (e).
If a node has costs $Cost_n$ and can terminate $port_n$ different ports, then the per circuit port cost is:

$$\frac{Cost_n}{port_n}.$$

As well as having a monetary cost, the links are assigned an administrative cost. The administrative cost is also referred to as a "weight". Assume that the weight of link e is $W_e$. The unit cost is incurred routing traffic between $n_1$ and $n_2$ and is computed by using a standard shortest path algorithm, for example, the Dijkstra or Bellman-Ford algorithms known to those skilled in the art, or the weighted graph (G, w). If traffic follows the path $e_1, e_2, \ldots e_m$ from source to destination, than the cost of routing the traffic is:

$$ucost(n_1 n_2) = \sum_{i=1}^{m} ucost(e_i).$$

If there are multiple paths $P_1, P_2 \ldots P_r$, then the average of these is taken to be the cost. The question then becomes how to judge the efficiency of a partitioning of a network.

A partition of the nodes will be a collection of subsets $P_1, P_2, \ldots, P_k$ such that:

$$P_i \cap P_j = \phi$$

and $$\cap_i P_i = N.$$

Defining a "cherry picking" matrix $C_{ij}$, the terms $C_{ij}$ represent the cherry picking opportunity for traffic from $P_i$ to $P_j$. Further define:

$$c_{ij} = \max_{n_1 \in P_i n_2 \in P_j} ucost(n_1, n_2) - \overline{ucost(P_i P_j)}$$

where $$\overline{ucost(P_i P_j)} = \frac{\sum_{n_1 \in P_1 n_2 \in P_j} ucost(n_1, n_2)}{|P_i| \times |P_j|}.$$

Those with skill in the art will appreciate that there may be a question with $\overline{ucost(P_i P_j)}$ whether to include the "diagonal" values ucost (n, n), or not. The costs seem slightly more realistic if they are not included.

Figure 3:
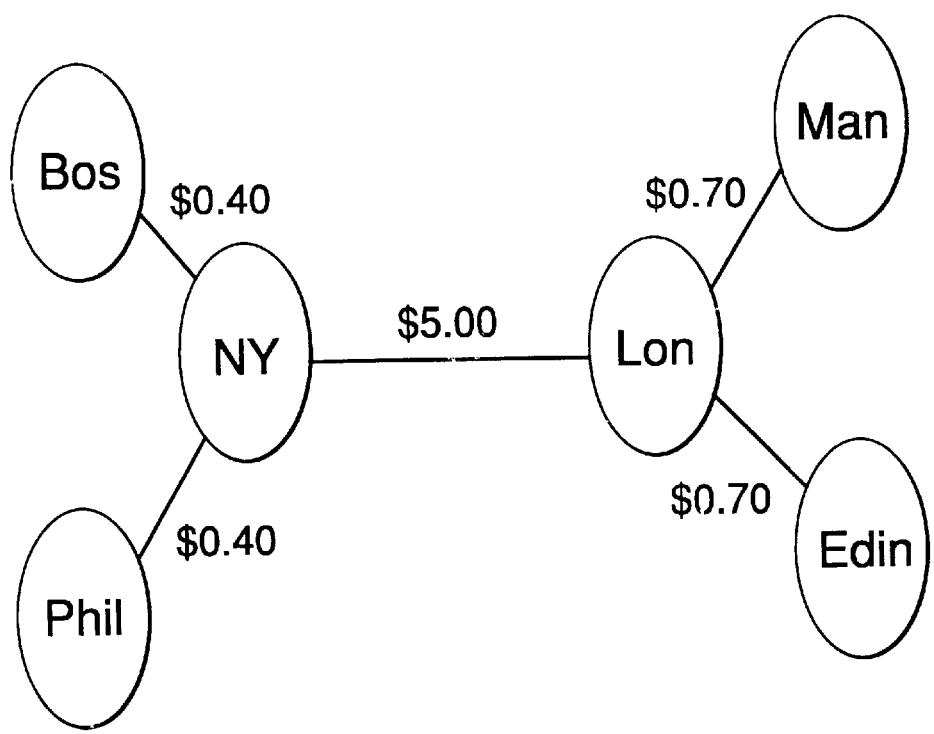
FIG. 3 is a network diagram of a network having a series of nodes and a single, transatlantic link.

Having defined the above terms, the problem becomes for a fixed given network, G, with routing weights, w, and a fixed value of n≧2, find the partition, P, of the vertices V into n groups such that $CPP_n = Max_{ij} C_{ij}$ is minimal. Consider the network of FIG. 3 (as well as the table of FIGS. 4 and 5 which will make the following evident), a transatlantic network between cities on the east coast of the United States (Boston, New York, Philadelphia), and cities in the United Kingdom, (Manchester, London, Edinburgh). If n=|G| then CPP==1 and the problem is trivial. At the other extreme case of n=2 the solution space is of size $2^{|G|-1}$ where |G| is the number of nodes in the graph G. An exhaustive search of these solutions is of exponential complexity. At best, this problem will be NP-complete. No formal complexity results are determined for the 2-partition problem, but its exact solution appears to be infeasible for large networks. If n>2 then the complexity is worse. The number of node pairs and their costs is shown in the table of FIG. 4. Taking the average, the cost is found to be $3.73. Thus the cherry picking potential of this network is $6.10–$3.73=$2.37 per kilobit for traffic between the non-gateway cities in the US to non-gateway cities in the UK.

The flip side of the cherry picking problem is seen very clearly in this example. A US-only network exists and so the network charges $3.73 per kilobit for services that cost less than $0.8 per kilobit. The result will be very little national business.

If the network is divided into $P_1$=(NY, Bos, Phil) and $P_2$=(Lon, Man, Edin) then the calculations in the table of FIG. 4 can be expanded to compute the CPP of the resulting network. This is found in the table of FIG. 5.

As a final step the following matrix is computed:

$$C = \begin{pmatrix} 0.2667 & 0.3667 \\ 0.3667 & 0.4667 \end{pmatrix}$$

The matrix $U = \overline{ucost(P_i P_j)}$ defines a flat rate tariff for flows between locations in $P_i$ and locations in $P_j$. Then C defines the cherry picking opportunity. Since the values in U are larger than the values in C, the cherry picking opportunity is considerably reduced. This is especially true for transatlantic traffic. This particular partition solves the cherry picking problem for these six nodes. In any other partition, either $P_1$ or $P_2$ contains nodes on both sides of the Atlantic and thus mixes transatlantic traffic and national traffic. The resulting difference between the average and maximum is larger than for this partition. Of course since there are only six nodes, there are only $2^6/2$ possibilities to consider. It is straightforward to compute the 32 cases and verify the statement directly.

Figure 7:
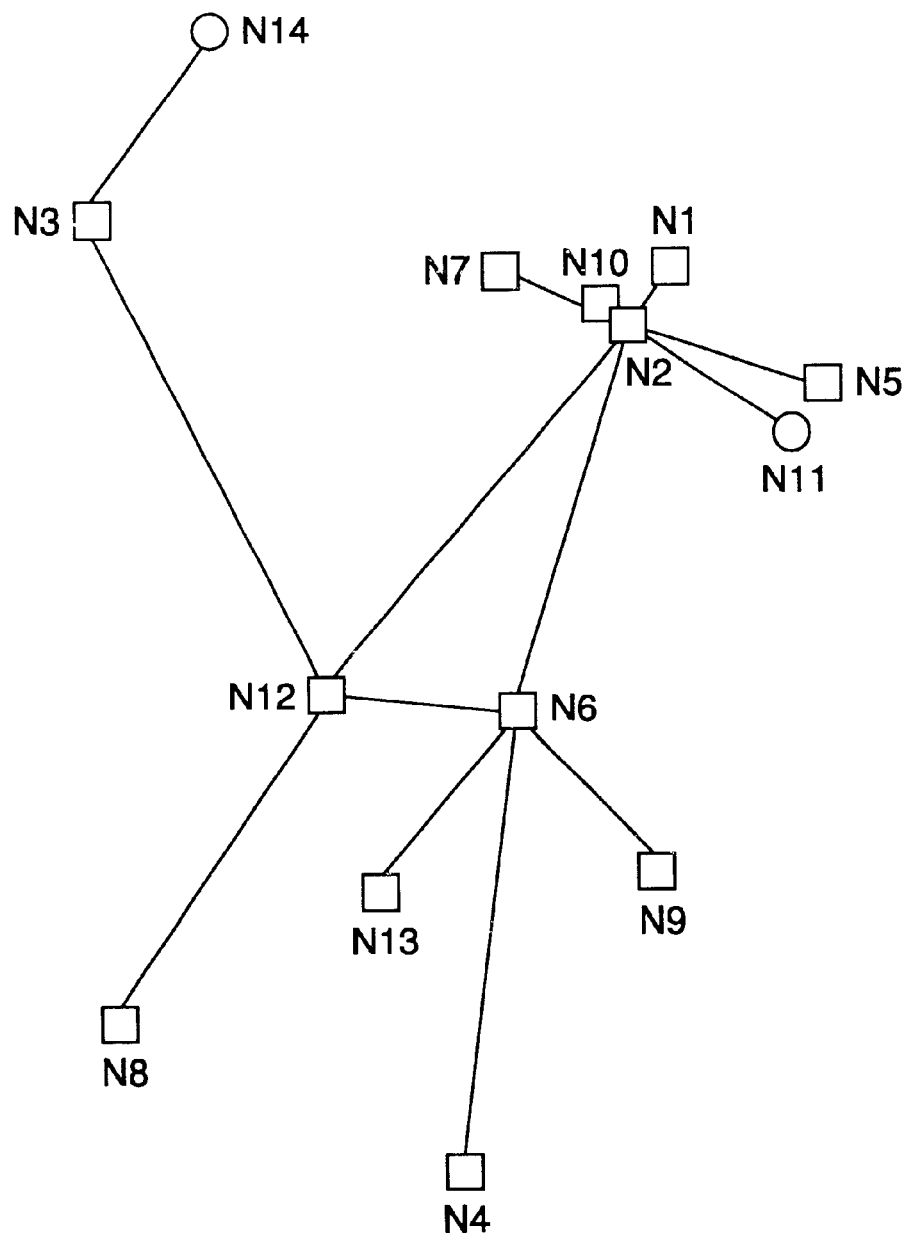
FIG. 7 is a network diagram of a sample network denoted herein as "Squareworld;"

In small networks having less than 20 nodes, it is possible to compute the optimal partitions by exhaustive enumeration. Consider a network with 14 nodes. The locations of the nodes are in "Squareworld", a 1000 mile by 1000 mile region in the American Midwest. The relative positions of the nodes can be seen in FIG. 7. Nodes N1–N10 and N12 and N13 are in partition 0, while nodes N11 and N14 are in partition 1. The network is designed with 56 Kbps and T1 links. The cost of these links and 9.6 Kbps links are described in the table of FIG. 6. The link costs exhibit a typical economy of scale. A 56 Kbps link costs 2.5 times more than a 9.6 Kbps link and has about 5.8 times the capacity, while a T1 costs 5 times a 56 Kbps line while having about 27.5 times the capacity.

In this particular problem, nodes have either 10 Kbps, 20 Kbps, or 40 Kbps of traffic. There are two nodes, N11 and N14 that have only 10 Kbps of traffic and are on the "edge" of the network. Consequently they carry no transit traffic and the most cost effective way of provisioning their bandwidth, keeping link utilization below 60%, is to use a pair of 9.6 Kbps links in parallel. Since the cost/kilobit on these links is 2⅓ times the cost on the 56 Kbps link, the best partition is to place N11 and N14 in one set and the remaining nodes in the other.

Figure 8:
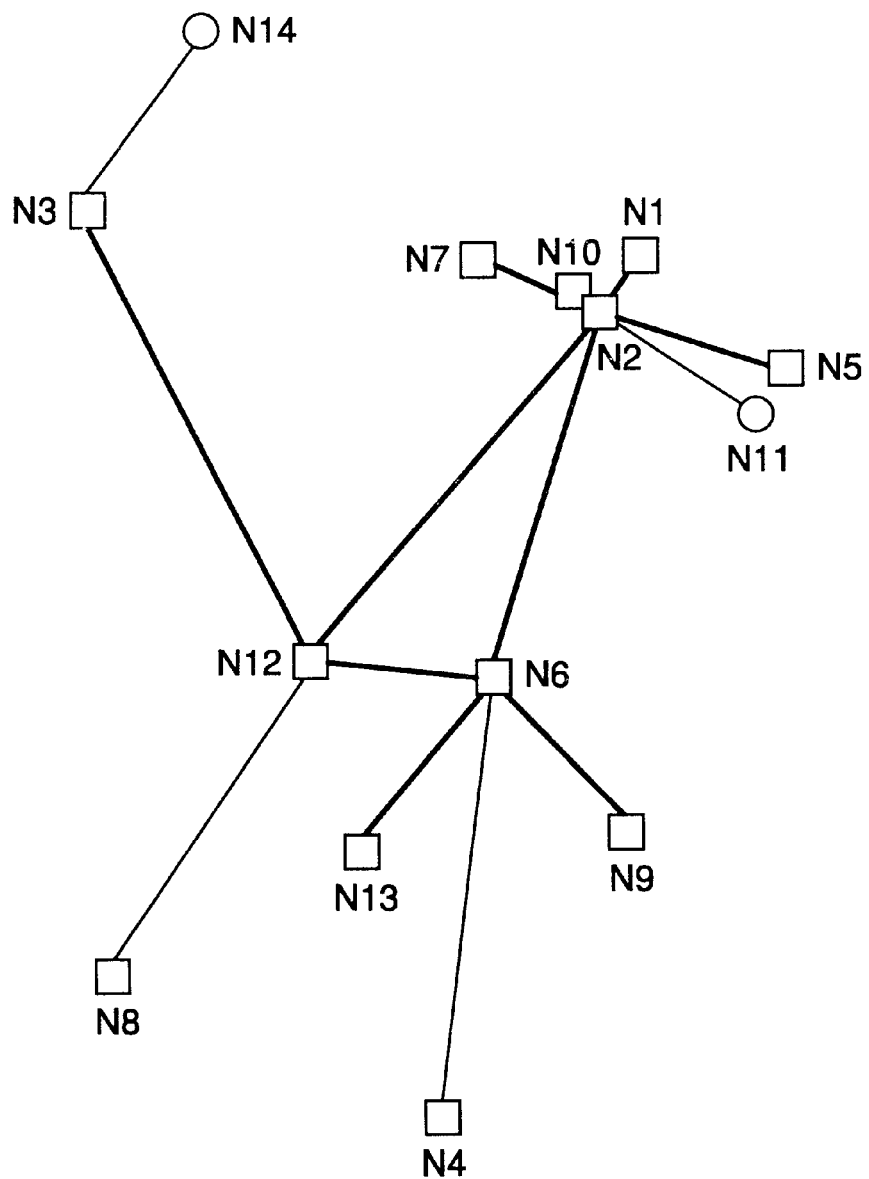
FIG. 8 is a network diagram of Squareworld wherein the optimized split of the network is illustrated when high speed/low cost lines are used.

It is possible to determine whether observations about this problem are correct by creating a second network partitioning. In this network, nodes N4, N8, N11, and N14 will all have 30 Kbps of traffic and the other nodes will have 300 Kbps of traffic. Thus it is expected that a good, low cost, design would be to connect the 4 nodes with less traffic using 56 Kbps lines and the rest of the nodes with T1 lines. In FIG. 8 this is exactly what occurs and nodes N4 and N8 are removed from partition 0 and added to partition 1. The cost per bit difference between high speed lines and low speed lines dominates the problem if there is a significant economy of scale. A network with more homogeneous traffic is obtained by restricting the network to a single link type in the designs. The link lists for a homogeneous network are shown in the table of FIG. 9. Generating a new network of 14 nodes, the traffic for each node is 200 Kbps, 300 Kbps, 400 Kbps or 500 Kbps.

Figure 10:
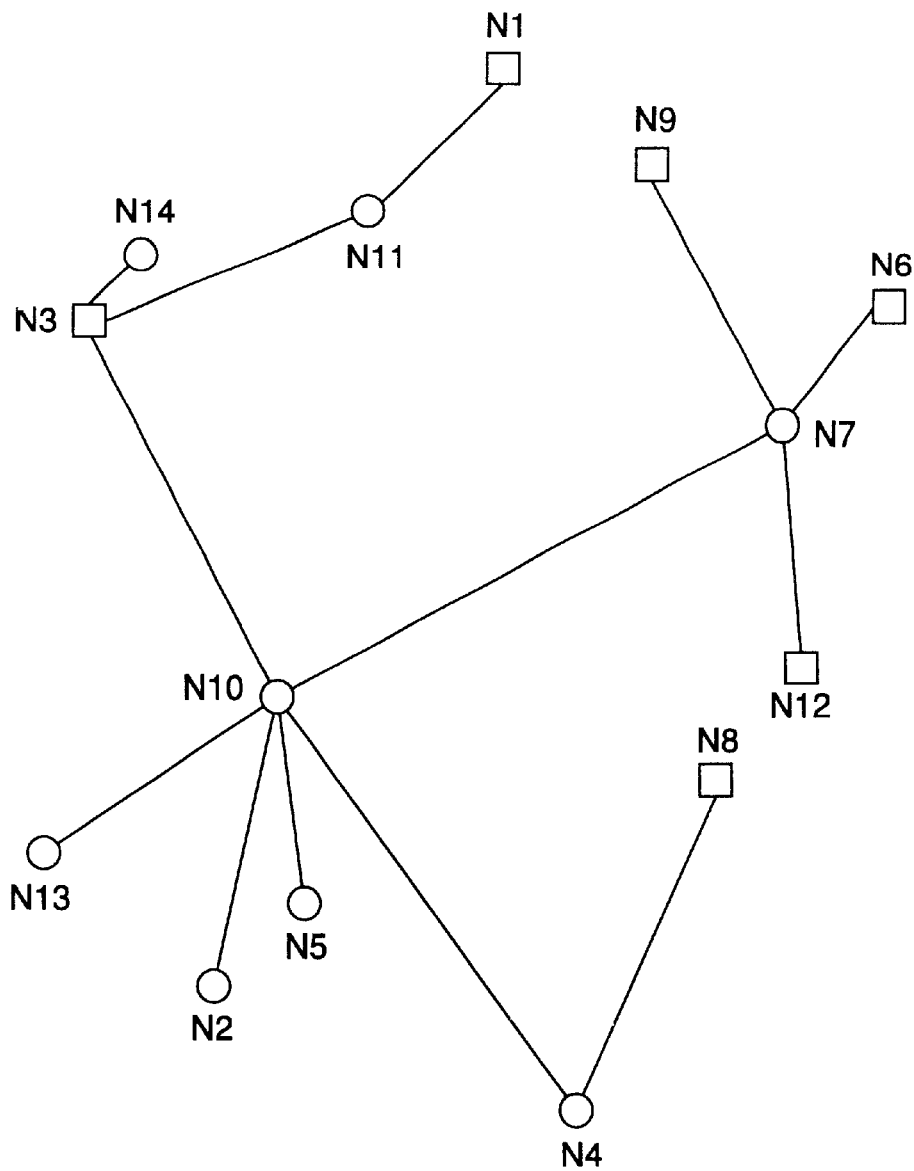
FIG. 10 is a network diagram of a fourteen node network having a single speed link that is optimally split.

FIG. 10 illustrates the design of this network with an optimal split having only one speed link. Nodes N1, N3, N6, N8, N9 and N12 are in partition 0, while the remaining are placed in partition 1. The optimal solution of this problem is reminiscent of the fare structure for a bus transportation system. The lowest cost is for circuits connecting the nodes in partition 1. Then comes a "2 zone fare". That is the cost of the service between nodes in the two partitions. Finally, there is a "3 zone fare" for service between nodes in partition 0. This is necessary since traffic must pass through the central zone. It is interesting to note that if there is significant traffic between N1 and N11, the charge will be far higher than the cost. These are the only two nodes that are on the same tree branch. Their traffic does not transit the nodes in partition 1 and yet, since the service between nodes in partition 0 is the most costly, they are charged a higher rate. This sort of traffic anomaly is inherent to a flat rate structure and not a special feature of this particular example.

Figure 11:
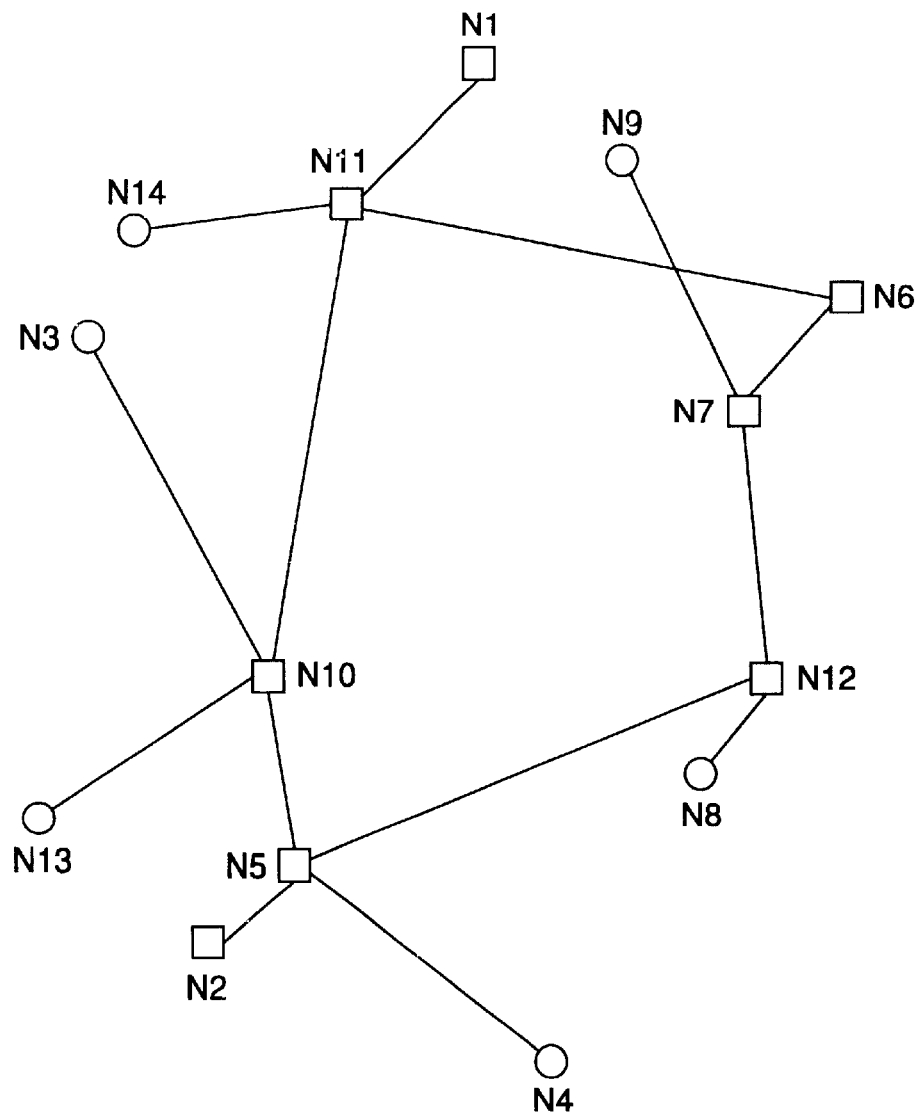
FIG. 11 is a network diagram of a tour-based, fourteen node network that is optimally split into two regions.

There is the possibility that the optimal solution splits a function of the tree-like nature of the design. In FIG. 11 a so-call ed "MenTour" design is illustrated. The Men-Tour design is described in "Wide Area Network Design: Concepts and Tools for Optimization," Robert Cahn, Morgan Kaufmann Publishers (1978), pp. 273–275, the teachings of which are incorporated herein by reference. Partition 0 comprises nodes N1, N2, N5, N6, N7, N10, N11, and N12, while the remaining nodes are placed in partition 1. It can be seen that the same core-periphery split is apparent as is found in the other examples. Also, it is possible in this example to see the dependence on proximity to the core of the network to being in the central partition. Nodes N1 and N2 are not in the backbone ring; but, because of their proximity to the core, are in the central partition.

While the problem of computing the optimal cherry picking partitions (CPP) of a network into two regions is interesting, all the designs tend to have the same shape—a central core and a periphery. This is the sort of design that is common to urban transportation systems. There are 1 zone, 2 zone, and 3 zone fares. In this case the 3 zone fare is equivalent to the tariff between peripheral nodes.

Figure 12:
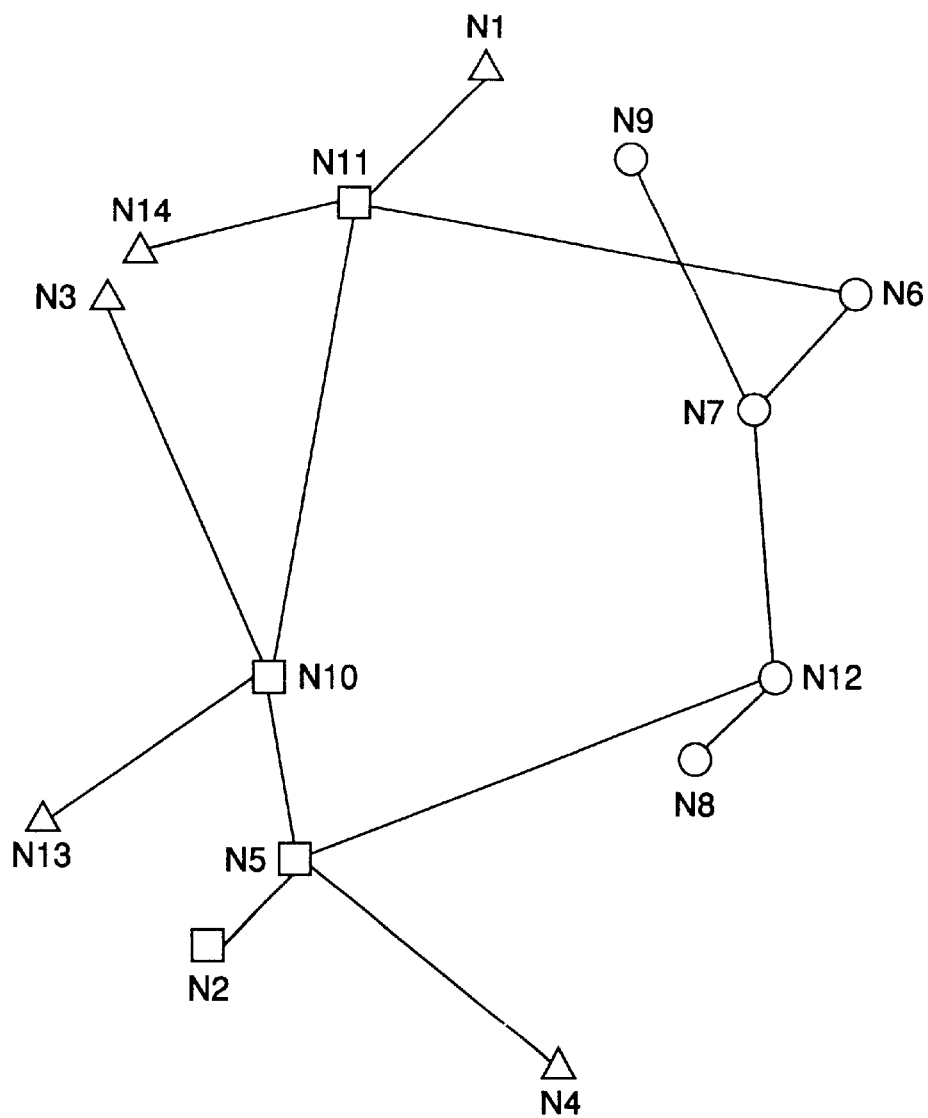
FIG. 12 is a network diagram of a tour-based, fourteen node network that is optimally split into three regions.

With two regions, the complexity of an exhaustive search is $O(n^3)$. With three regions it is $O(n^4)$. Such searches are still possible with small networks. In FIG. 12 the optimal three regions for the network is shown that was partitioned into two regions in FIG. 11. In the network of FIG. 12, partition 0 comprises nodes N2, N5, N10 and N11; partition 1 comprises nodes N6, N7, N8, N9 and N12; and partition 2 comprises nodes N1, N3, N13 and N14.

There are several interesting things to note about this partition. The central ring has been split in half, with half the nodes in partition 0 and the other half in partition 1. While partitions 0 and 1 are contiguous sets of nodes partition 2 is not. Using three regions reduces the cherry picking opportunity from 16.29 to 12.98.

It is clearly infeasible to solve the cherry picking problem for m regions by enumeration. The problem blows up to $O(n^m)$, i.e. it is exponential in m for values of m<n/2. Consequently, a different approach must be utilized. A basic algorithm to solve the problem is first to seed each region with a single randomly selected node, then choose an unassigned node, n, at random. For each region, r, compute, CPPr, the cherry picking potential when the node is added to region r. Add n to the region r with the minimum CPP, terminate when all nodes are assigned.

Computational experience has shown that this tends to produce rather poor results because nodes may be added virtually arbitrarily at the beginning of the process. It is possible to recover from this by following the initial solution with a greedy optimizer algorithm that loops through all the nodes, then loops through the regions as was illustrated by the preferred method of FIG. 2. The algorithm computes the new cherry picking potential $CPP^1(n,s)$, if the node is reassigned from the current region r to region s. It is then desired to select the pair (n,s) that maximizes the improvement in the CPP and switch n into region s. If there is no such pair, terminate the loop.

Figure 13:
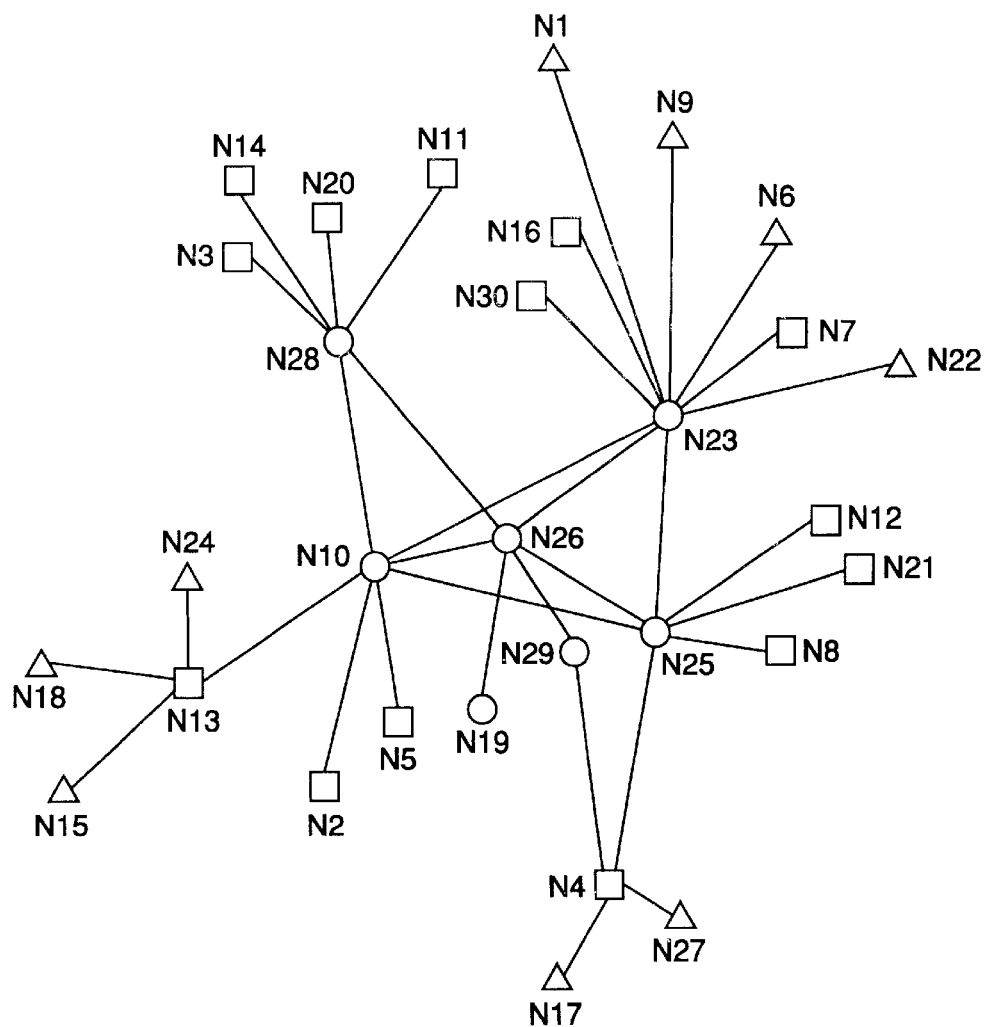
FIG. 13 is a network diagram of a thirty node, mesh network that is optimally split into three regions.

These two algorithms, preferably run sequentially, have proved effective in finding regions with low cherry picking potential in a reasonable amount of time. In FIG. 13, a thirty node network and a 3-region partition of the network that was computed by these algorithms is depicted. For this partitioning, partition 0 comprises nodes N2, N3, N4, N5, N7, N8, N11, N12, N13, N14, N16, N20, N21 and N30; partition 1 comprises nodes N10, N19, N23, N25, N26, N28 and N29; and partition 2 comprises nodes N1, N6, N9, N15, N17, N18, N22, N24 and N27.

Figure 14:
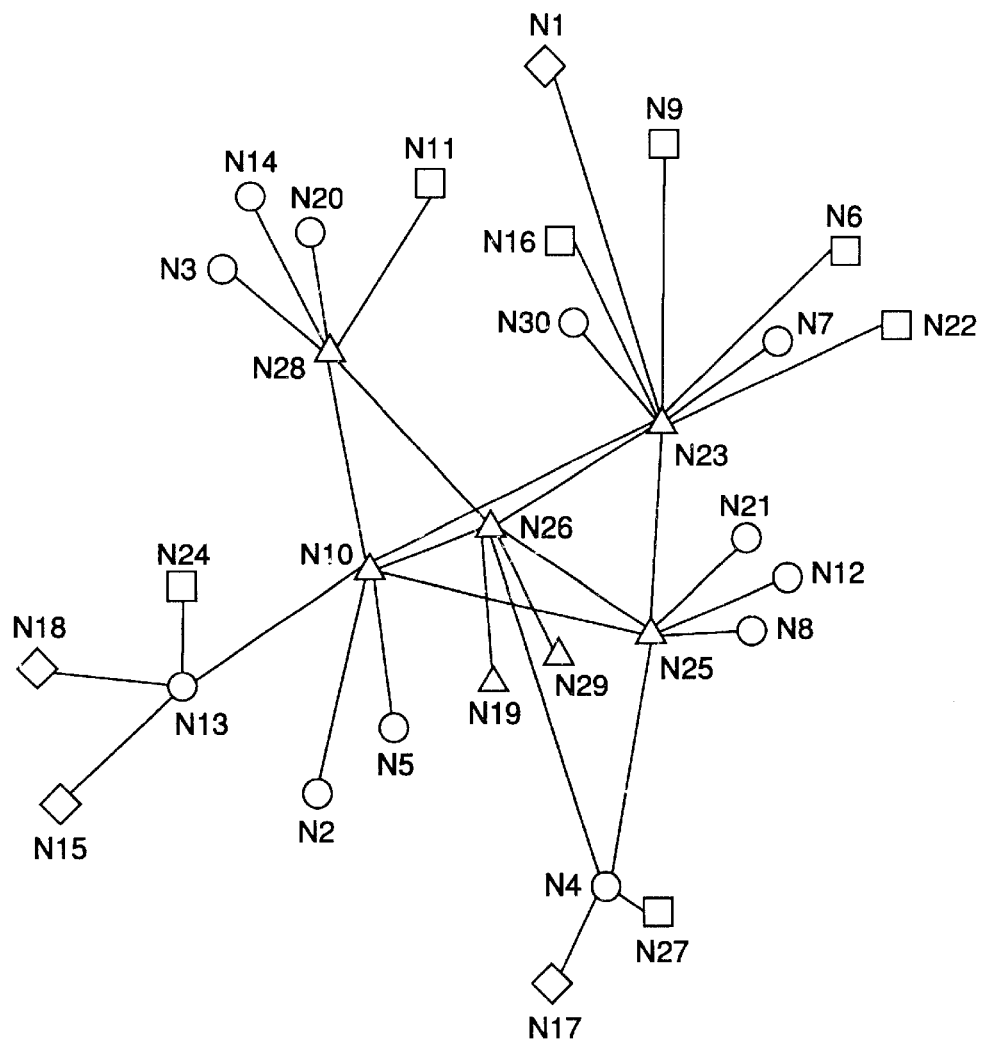
FIG. 14 is a network diagram of a thirty node, mesh network that is partitioned into four regions.
Figure 15:
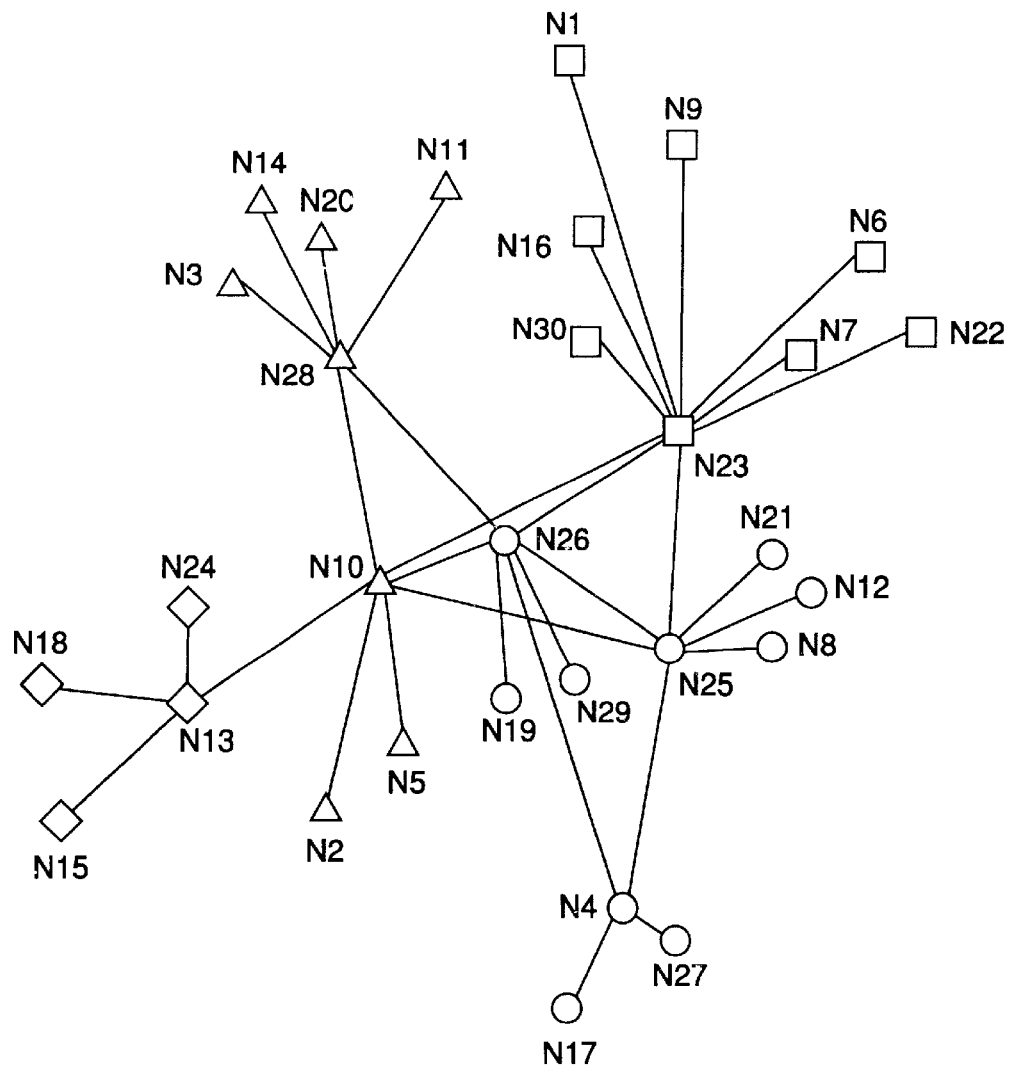
FIG. 15 is a network diagram of a thirty node network having a four region, geographic partition.

Referring to FIG. 14, the results for four partitions are illustrated. Here, partition 0 comprises nodes N6, N9, N11, N16, N22, N24 and N27; partition 1 comprises nodes N2, N3, N4, N5, N7, N8, N12, N13, N14, N20, N21 and N30; partition 2 comprises nodes N10, N19, N23, N25, N26, N28 and N29; and partition 3 comprises nodes N1, N15, N17 and N18. It is interesting to determine if this partition is significantly better than a simple, geographic partition. In FIG. 15, the CPP for four sample regions is shown. After the cherry picking algorithms of the present invention are applied, it can be seen that partition 0 comprises nodes N1, N6, N7, N9, N16, N22, N23 and N30; partition 1 comprises nodes N4, N8, N12, N17, N19, N21, N25, N26, N27 and N29; partition 2 comprises nodes N2, N3, N5, N10, N11, N14, N20 and N28; and partition 3 comprises nodes N13, N15, N18 and N24. The results are dramatically different with the optimization algorithm having a CPP of $8.58/Kb, while the nave partition has one of $14,591/Kb. Computational experience has shown that a modest number of runs of the algorithms produces significant improvements over the partitions that might be produced manually.

Application of the algorithms involves understanding the relationship between the number of regions and the CPP. Given r regions, the size of the tariff is $O(r^2)$. Thus, if a 200 site network exists, and each site is put in a region of one node, the resulting tariff contains about 20,000 entries. This becomes unwieldy since every modification of the network might necessitate the recomputation of the tariff.

Figure 17:
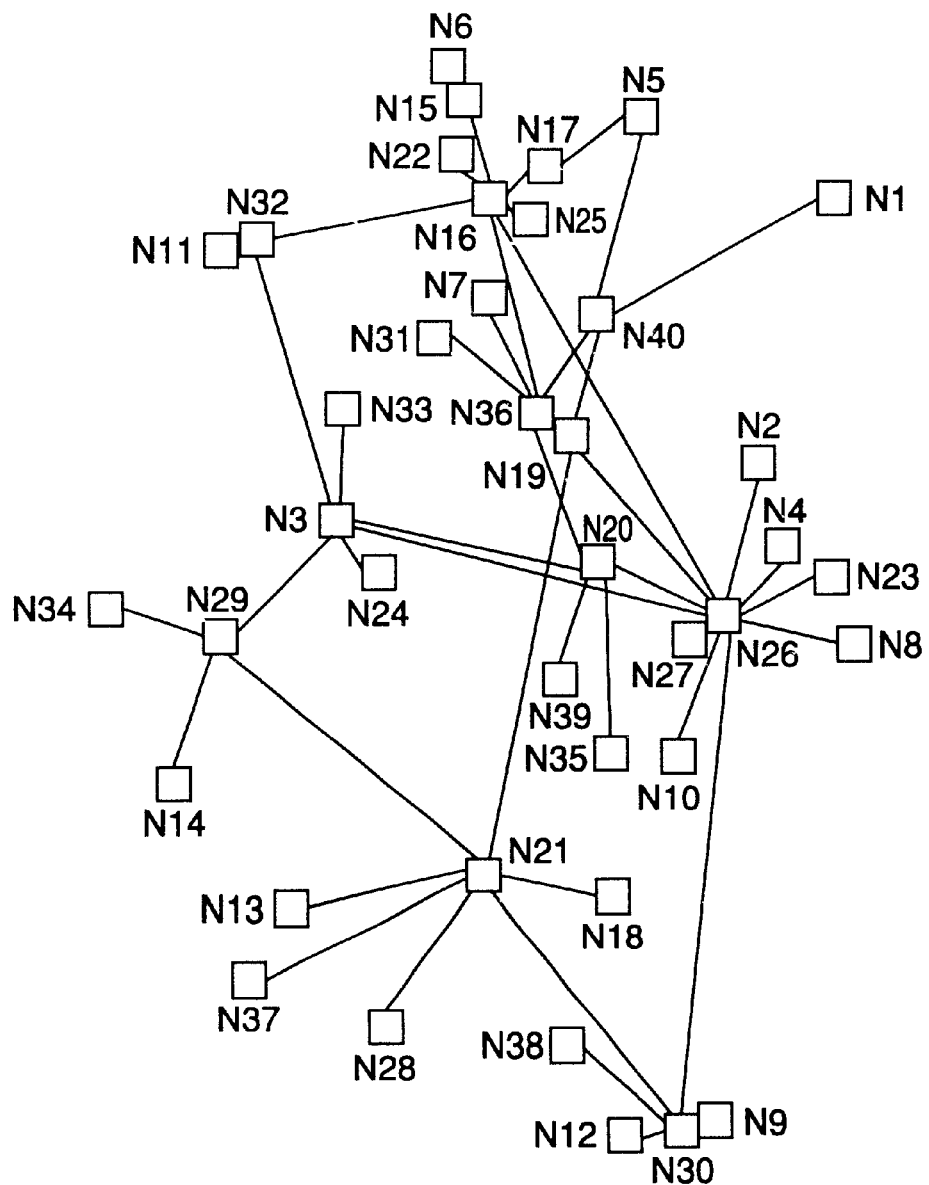
FIG. 17 is a network diagram of a forty node network having a cost of about $465K/month.

The practical use of the cherry picking algorithms of the present invention is to reduce the cherry picking to exposure below an acceptable threshold. The algorithms described above may be used to examine the relationship between the number of regions and the CPP for the 40 node, T1-based network. FIG. 17 shows a two region solution with only one partition which has a CPP of $17.20/kilobit. This results in an average cost of $24.51, which is quite high. Using the inventive algorithms for finding cherry picking regions described herein, it can be seen that as the number of regions increases, the CPP decreases.

Figure 18:
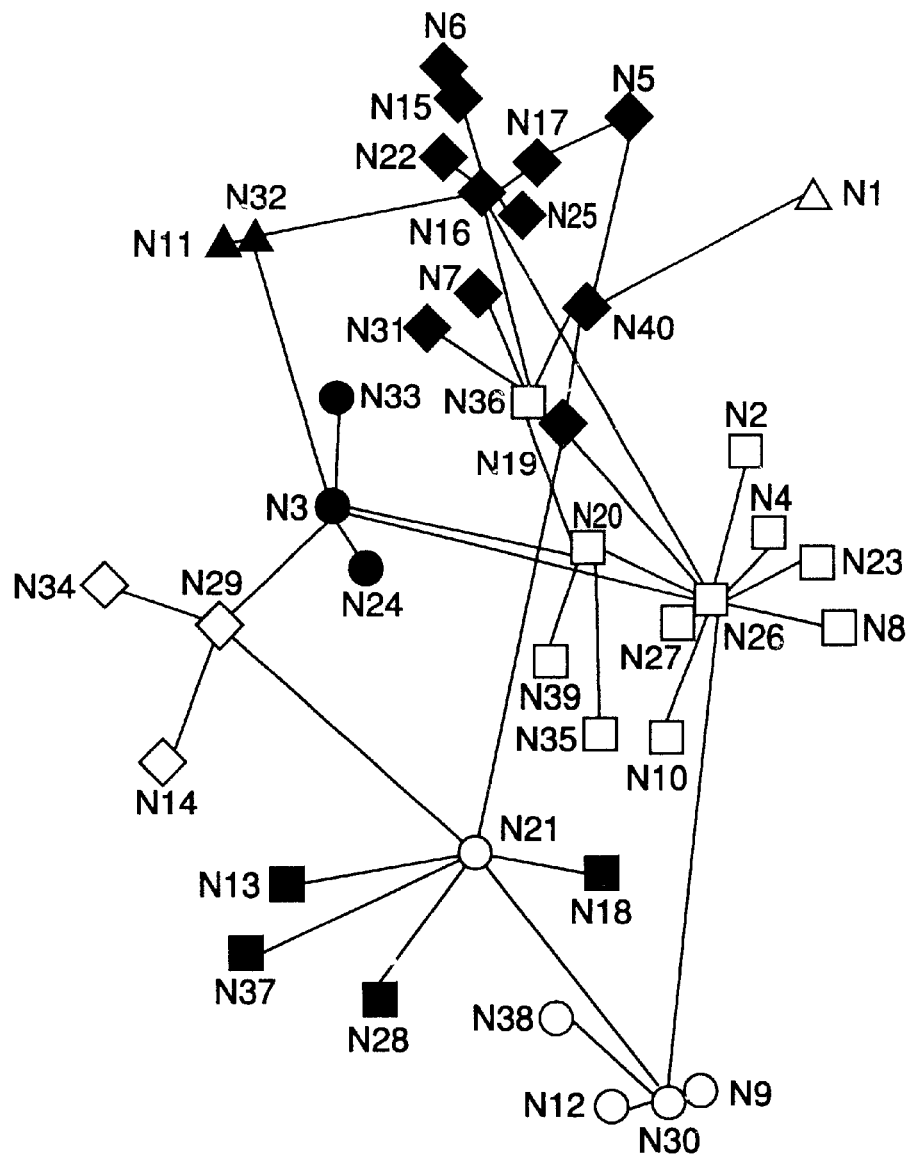
FIG. 18 is a network diagram of the network of FIG. 17 partitioned into eight regions.

One of the more interesting observations about the results of the table of FIG. 16 are the very large drops in the CPP between regions one and two, and between regions two and three as partitioning progresses. This is to be expected since a large, unregionalized network is most susceptible to cherry picking. What is most interesting is the design at eight regions. At that point, the regions become more geographically compact and the CPP drops steeply. This is shown in the network of FIG. 18.

This figure shows a 40 node network partitioned into eight regions wherein partition 0 comprises nodes N2, N4, N8, N10, N20, N23, N26, N27, N35 and N39; partition 1 comprises nodes N9, N12, N21, N30 and N38; partition 2 comprises node N1; partition 3 comprises nodes N14, N29 and N34; partition 4 comprises nodes N13, N18, N28 and N37; partition 5 comprises nodes N3, N24 and N33; partition 6 comprises nodes N11 and N32; and partition 7 comprises nodes N5, N6, N7, N15, N16, N17, N19, N22, N25, N31 and N40. Suppose that in this network it has been concluded that eight regions is the "right" number of regions, but that the CPP from eight regions is still too high to operate a network cost-effectively since it represents too much risk. One solution is to raise the region-to-region tariff to a multiple of the average tariff. Thus, the definition of cherry picking can be modified $$c_{ij} = \max_{n_j \in P_i, n_2 \in P_j} \mu cost(n_1, n_2) - \text{margin} \times \overline{ucost(P_i P_j)}$$

with margin $\geq 1$. Clearly if a value of margin is chosen that is greater than two, the price of services will be so inflated that in competitive situations, traffic on the network will still be lost. Still, modest values of margin can significantly reduce the CPP. In the table of FIG. 19 the effect of margin on the CPP is illustrated. The effect is not simply linear since when the algorithms are re-run with the new value in an attempt to find a better design, the results are quite dramatic. The CPP can be reduced by nearly 50% by adding a 20% margin to the tariff. The changed objective function steers the search and finds different designs. Thus, if the CPP is to be used to create a public tariff, then the margin and number of regions should be decided on before the tariff is published since changing the tariff will result in different partitions of the network.

Thus, it can be seen that application of the inventive algorithms described herein to reduce cherry picking in networks greatly improves the revenue received from operating networks. This allows networks to be managed and run more efficiently than they have been in the past and maximizes profits for network providers. Such results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps, which perform substantially the same function in substantially the same way to achieve the same results, be within the scope of the invention. Substitutions of method steps and elements from one described embodiment to another are also fully intended and contemplated. It is the intention, therefore, to be limited only as indicated by the scope of the claims appended hereto.

What is claimed is:

1. A method of minimizing cherry picking in a telecommunications network comprising nodes, and regions in which the nodes may exist, comprising the steps of:

seeding each region in the network with a single, randomly selected node;

choosing an unassigned node in the network at random;

computing a cherry picking potential for each region in the network when the unassigned node is added to the region to obtain cherry picking potentials for each region; and adding the unassigned node to the region with the minimum cherry picking potential from the cherry picking potentials computed when the cherry picking potentials for each region are computed.

2. The method recited in claim 1, further comprising the steps of:

determining a new cherry picking potential for each of the nodes in each of the regions if a node has been reassigned from one region to another region; and selecting a node for a new region that maximizes improvement in the cherry picking potential and switching the selected node to the new region.

3. The method recited in claim 2, further comprising the step of determining the total number of regions in the network.

4. The method recited in claim 3, further comprising the step of determining whether there are any regions in the network that have not been identified and do not currently comprise a node.

5. The method recited in claim 2, wherein the determining step comprises the step of looping through all of the nodes in the network and looping through all of the regions in the network to determine whether a node will be reassigned from one region to another in the network as a result of determining the new cherry picking potential for each of the nodes.

6. The method recited in claim 5, further comprising the step of determining whether other nodes have been assigned to new regions in the network as a result of looping through all of the regions in the network.

7. The method recited in claim 6, wherein the selecting step comprises the step of selecting the node and region pair that maximizes the improvement in the cherry picking potential of the network.

8. A method of determining whether a cherry picking potential of a network comprising nodes and regions in which the nodes may exist has been minimized, comprising the steps of:

determining a theoretical cherry picking potential of the network;

observing an actual cherry picking potential of the network; and comparing whether the actual cherry picking potential of the network falls within a range around the theoretical cherry picking potential of the network, thereby determining whether the actual cherry picking potential is at a minimum.

9. The method recited in claim 8, wherein the range is between about ten and twenty-five percent.

10. The method recited in claim 9, wherein the determining step comprises the steps of:

determining a new actual cherry picking potential for each of the nodes in each of the regions if a node has been reassigned from one region to another region; and selecting a node for a new region that maximizes improvement in the actual cherry picking potential and switching the selected node to the new region.

11. The method recited in claim 10, further comprising the step of determining the total number of regions in the network.

12. The method recited in claim 11, further comprising the step of determining whether there are any regions in the network that have not been identified and do not currently comprise a node.

13. The method recited in claim 10, wherein the determining step comprises the step of looping through all of the nodes in the network and looping through all of the regions in the network to determine whether a node will be reassigned from one region to another in the network as a result of determining the new actual cherry picking potential for each of the nodes.

14. The method recited in claim 13, further comprising the step of determining whether other nodes have been assigned to new regions in the network as a result of looping through all of the regions in the network.

15. The method recited in claim 14, wherein the selecting step comprises the step of selecting the node and region pair that maximizes the improvement in the actual cherry picking potential of the network.

\* \* \* \* \*